(12) United States Patent
Lütjens et al.

(10) Patent No.: US 6,610,753 B2
(45) Date of Patent: *Aug. 26, 2003

(54) PROCESS FOR PREPARING SELECTIVE ION EXCHANGERS

(75) Inventors: Holger Lütjens, Köln (DE); Klaus Rall, Köln (DE); Axel Ingendoh, Odenthal (DE); Reinhold Klipper, Köln (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,682

(22) Filed: Aug. 10, 1999

(65) Prior Publication Data

US 2002/0193454 A1 Dec. 19, 2002

(30) Foreign Application Priority Data

Aug. 18, 1998 (DE) .......................... 198 37 294

(51) Int. Cl.$^7$ ................. C08J 5/20; C08F 8/10
(52) U.S. Cl. ................ 521/32; 525/326.4; 525/327.5; 525/327.6; 525/328.2; 525/332.4
(58) Field of Search .................. 521/32; 525/326.4, 525/327.5, 327.6, 328.2, 332.2, 332.4

(56) References Cited

FOREIGN PATENT DOCUMENTS

| DE | 79152 A | * | 5/1969 |
| DE | 79152 | | 1/1971 |
| DE | 238053 | * | 8/1986 |
| GB | 862636 | | 3/1961 |
| GB | 862636 | * | 3/1969 |

OTHER PUBLICATIONS

Rudolf Hering, Chelatbildende Ionenaustatuscher, Akademie Verlag, Berlin (month unavailable) 1967, pp. 51–53 Chelon–Polymerisationsharze.

Database WPI, Section Ch, Week 198526, Derwent Publications Ltd., London, GB; Class A13, AN 1985–156339, XP002123713, & JP 60 088008 A (Asahi Chem Ind Co Ltd), 17. Mai 1985 (May 17, 1985) *Zusammenfassung.

Database, WPI, Section Ch, Week 198335, Derwent Publications Ltd., London, GB; Class A13, AN 1983–751191, XP002123714 & RO 81 073 A (Comb Chim Victoria), Jan. 30, 1983 *Zusammenfassung.

* cited by examiner

Primary Examiner—Tatyana Zalukaeva
(74) Attorney, Agent, or Firm—Godfried R. Akorli; Diderico van Eyl

(57) ABSTRACT

The present invention relates to a process for preparing selective ion exchangers based on crosslinked vinylaromatic polymers and containing iminoacetic acid units of the general formulas (I) and (II)

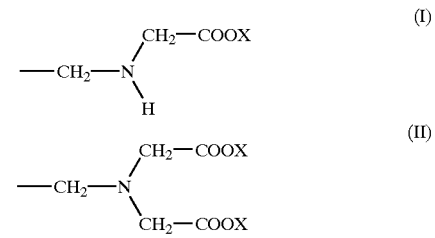

wherein X represents hydrogen or an alkali metal ion, by reacting a weak-base anion exchanger bearing primary amino groups with monochloro-acetic acid and/or an alkali metal salt of monochloroacetic acid at a temperature of from 70 to 110° C. and a pH of from 7 to 11.

5 Claims, No Drawings

PROCESS FOR PREPARING SELECTIVE ION EXCHANGERS

BACKGROUND OF THE INVENTION

The present invention relates to a process for preparing selective ion exchangers based on crosslinked vinylaromatic polymers and containing iminoacetic acid units of the general formulas (I) and (II)

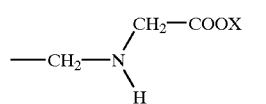

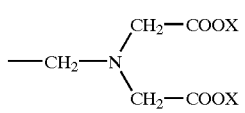

where X represents hydrogen or an alkali metal ion, by reacting a weak-base anion exchanger bearing primary amino groups with monochloro-acetic acid and/or an alkali metal salt of monochloroacetic acid.

Environmentally significant metal ions (e.g., heavy metal ions) are removed from solutions containing alkali metal salts and alkaline earth metal salts using selective ion exchangers. These selective ion exchangers are characterized in that their active group binds a certain type of metal ion or group of metal ions to form a chelate complex. For this reason, this group of ion exchangers is also customarily termed chelating ion exchangers. In industrial applications, chelating resins containing weak-acid iminoacetic acid groups that display pronounced selectivity for a number of heavy metals or transition metals have, in particular, become established.

The different abilities of these chelating resins to bind heavy metal ions is first and foremost due to their different content of iminoacetic acid groups. Setting the content of iminoacetic acid groups precisely and reproducibly in the production process is therefore of great importance for the product quality in respect of the ability to bind heavy metals and in respect of the osmotic stability (swelling stability). In addition, it has been found to be advantageous in some application areas for only a certain proportion of the total amount of chelating groups in the ion exchanger to be made up of iminodiacetic acid groups and for the remainder to be made up of aminoacetic acid groups. Setting the ratio of iminodiacetic acid/aminoacetic acid groups precisely likewise requires a reproducible, precisely controllable production process.

It is known that chelating resins containing iminoacetic acid groups can be prepared, inter alia, by reacting weak-base anion exchangers with monochloroacetic acid (Rudolf Hering, Chelatbildende Ionenaustauscher, Akademie Verlag, Berlin 1967, pp. 51 ff). A disadvantage of this method is the very large excess of monochloroacetic acid used for achieving the required degree of conversion because of the low degree of utilization of the monochloroacetic acid. This is not only uneconomical but also leads to increased wastewater pollution, particularly with respect to absorbable halogen compounds (AOX).

It is an object of the present invention to develop a process for preparing selective ion exchangers based on iminoacetic acid units that has a high degree of conversion of monochloroacetic acid, thus enabling the above-mentioned disadvantages to be avoided.

This object is achieved in that the reaction of weak-base anion exchangers with monochloroacetic acid while maintaining specific reaction conditions enables selective ion exchangers or chelating resins having a reproducible content of iminoacetic acid groups to be obtained while at the same time achieving an optimal conversion in respect of the monochloro-acetic acid.

SUMMARY OF THE INVENTION

The invention accordingly relates to a process for preparing selective ion exchangers based on crosslinked vinylaromatic polymers and containing iminoacetic acid units of the general formulas (I) and (II)

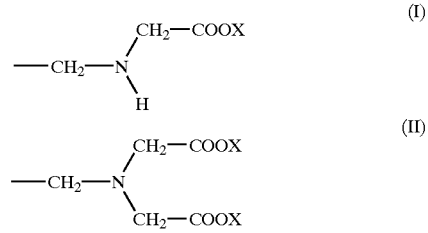

wherein X represents hydrogen or an alkali metal ion, comprising reacting a weak-base anion exchanger bearing primary amino groups with monochloroacetic acid and/or an alkali metal salt of monochloroacetic acid at a temperature of from 70 to 110° C. and a pH of from 7 to 11 (preferably from 8 to 10).

DETAILED DESCRIPTION OF THE INVENTION

The process of the invention is preferably used to obtain selective ion exchangers containing iminoacetic acid units of the general formulas (I) and (II) in which X in each case represents hydrogen, sodium, and/or potassium.

The vinylaromatic polymers on which the selective ion exchangers are based are polymers based on vinylaromatics such as styrene, vinyltoluene, ethylstyrene, α-methylstyrene, chlorostyrene, o-chloromethyl-styrene, m-chloromethylstyrene, p-chloromethylstyrene, vinylpyridine, and vinylnaphthalene. It is also possible to use polymers prepared using nonaromatic monomers having one copolymerizable double bond per molecule. Such monomers include, for example, acrylic acid, methacrylic acid, acrylic esters, methacrylic esters, acrylonitrile, methacrylonitrile, acrylamide, methacrylamide, vinyl chloride, vinylidene chloride, and vinyl acetate. The monoethylenically unsaturated monomers for the preparation of the vinylaromatic polymers preferably contain not more than 10% by weight of such nonaromatic monomers, based on the total weight of the monomers.

The vinylaromatic polymers are crosslinked, preferably by copolymerization with crosslinking monomers having more than one (preferably 2 or 3) copolymerizable C=C double bonds per molecule. Such crosslinking monomers include, for example, polyfunctional vinylaromatics such as divinylbenzene, trivinylbenzene, divinylethylbenzene, divinyltoluene, divinylxylene, and divinylnaphthalene, polyfunctional allylaromatics such as diallylbenzene and triallylbenzene, polyfunctional vinyl- and allyl-heterocycles such as trivinyl and triallyl cyanurate and isocyanurate, N,N'-$C_1$-$C_6$-alkylenediacrylamides and N,N'-$C_1$-$C_6$-alkylenedimethacrylamides such as N,N'-methylenediacrylamide and N,N'-methylenedimethacrylamide, N,N'-ethylenediacrylamide, and N,N'-ethylenedimethacrylamide, polyvinyl and polyallyl ethers of saturated $C_2$–$C_{20}$-polyols having from 2 to 4 OH groups per molecule, such as ethylene glycol divinyl and diallyl ethers and diethylene glycol divinyl and diallyl ethers, esters of unsaturated $C_3$–$C_{12}$-alcohols or saturated $C_2$–$C_{20}$-polyols having from 2 to 4 OH groups per molecule, such as allyl methacrylate, ethylene glycol di(meth)acrylate, glyceryl tri(meth)acrylate, pentaerythrityl tetra(meth)acrylate, divinylethyleneurea, divinylpropylene-urea, and divinyl adipate, and aliphatic and cycloaliphatic olefins containing 2 or 3 isolated C=C double bonds, such as 1,5-hexadiene, 2,5-dimethyl-1,5-hexadiene, 1,7-octadiene, and 1,2,4-trivinylcyclohexane. Particularly useful crosslinking monomers have been found to be divinylbenzene (as an isomer mixture) and mixtures of divinylbenzene and aliphatic $C_6$–$C_{12}$-hydrocarbons containing 2 or 3 C=C double bonds. The crosslinking monomers are generally used in amounts of from 2 to 20% by weight (preferably from 2 to 12% by weight), based on the total amount of polymerizable monomers used.

The crosslinking monomers do not have to be used in pure form but can also be used in the form of their commercial mixtures of lower purity (e.g. divinylbenzene in mixtures with ethylstyrene).

To prepare the weak-base anion exchangers containing the primary amino groups from the crosslinked vinylaromatic polymers, it is possible to employ the chloromethylation process with subsequent amination or the aminomethylation process with subsequent saponification. These preparative methods are known. In the preferred aminomethylation process, crosslinked vinylaromatic polymers are reacted with reactive phthalimide derivatives, for example N-chloromethylphthalimide, and the resulting phthalimido compounds are hydrolyzed to give the corresponding primary amines. The crosslinked vinylaromatic polymers bearing primary amino groups are the starting materials for the process of the invention and contain from 0.5 to 1.5 amino groups (preferably from 0.5 to 1.2 amino groups) per aromatic ring. The starting materials can be gels or can be macroporous; preference is given to macroporous starting materials.

The process of the invention is carried out as follows:

The weak-base anion exchanger bearing the primary amino groups (i.e., "starting material") is suspended in water with stirring. In general, the water is heated to the intended reaction temperature before addition of the starting material or, preferably, the suspension of the starting material in water is heated to the intended reaction temperature. The claimed range of the reaction temperature of the process of the invention is from 70 to 110° C. (preferably from 80 to 100° C.). Reaction temperatures of less than 70° C. or more than 110° C. are to be avoided because secondary reactions prevent a reproducible reaction and thus a precisely settable product quality in terms of the content of iminoacetic acid units of the structures (I) and (II) and also prevent an optimum conversion based on the mono-chloroacetic acid and/or the alkali metal salt of the monochloroacetic acid. Upon reaching the reaction temperature, the monochloroacetic acid and/or the alkali metal salt of monochloroacetic acid (preferably monochloroacetic acid) is metered in stepwise or preferably continuously at a rate which allows reliable temperature control. At the same time, during the entire reaction, the pH is maintained in the claimed range from 7 to 11 (preferably from 8 to 10) by continuously metering in an inorganic base, preferably aqueous sodium hydroxide solution. To ensure a reproducible production process, it is advantageous to meter in the monochloroacetic acid and/or the alkali metal salt of monochloroacetic acid and the aqueous sodium hydroxide solution over a period of from 3 to 8 hours in the claimed range of reaction temperature and of pH and subsequently to stir for from 3 to 6 hours at the same reaction temperature and the same pH, so that the total reaction time is from 6 to 14 hours. It is particularly advantageous to meter the monochloroacetic acid and the aqueous sodium hydroxide solution continuously at a constant mass ratio to one another into the suspension of the starting material in the claimed range of reaction temperature and of pH while stirring. In order to achieve optimal mixing in industrial-scale reaction batches, this can be carried out by simultaneously metering monochloroacetic acid and aqueous sodium hydroxide solution into a pumped circuit (loop) in which the reaction mixture present in the reactor is continually circulated by pumping. The use of pH values of less than 7 and more than 11 is to be avoided during the entire reaction, because otherwise a reproducible reaction and thus a precisely settable product quality in terms of the content of iminoacetic acid units of the formulas (I) and (II) is prevented and an optimum conversion based on the monochloroacetic acid and/or the alkali metal salt of monochloroacetic acid is also prevented.

The total amount of monochloroacetic acid and/or alkali metal salt of monochloroacetic acid used in the process of the invention is from 1.40 to 2.85 mol (preferably from 1.65 to 2.80 mol) per mol of primary amino groups in the starting material. The total amount of inorganic base added, preferably aqueous sodium hydroxide solution, is generally from 2 to 2.2 mol per mol of monochloroacetic acid and/or from 0.95 to 1.05 mol per mol of alkali metal salt of monochloroacetic acid in the process of the invention.

After the reaction, the chelating resin is present in the alkali metal (preferably Na) form and can be converted into the H form in a known manner by ion exchange with inorganic acid, preferably dilute sulfuric acid.

The degree of conversion of the monochloroacetic acid and/or the alkali metal salt of monochloroacetic acid, defined as the ratio of the number of moles of weak-acid groups (acetic acid groups) present in the chelating ion exchanger to the number of moles of monochloroacetic acid and/or the alkali metal salt of monochloroacetic acid used, is from 0.70 to 1.00 (namely, from 70 to 100%), preferably from 0.70 to 0.90 (namely, from 70 to 90%), in the process carried out according to the invention.

The number of weak-acid groups in the chelating ion exchanger can be determined, for example, by titrimetric methods. The proportion of iminodiacetic acid groups corresponding to formula (II) based on the total content of iminoacetic acid units of the formulas (I) and (II) is from 40 to 100 mol % (preferably 50–100 mol %) in the chelating ion exchangers prepared by the process of the invention. The degree of substitution of the primary amino groups—that is, the ratio of weak-acid groups (acetic acid groups) to the nitrogen content of the chelating ion exchanger—is described by the TC/N ratio. The TC/N ratio is a dimensionless number which is defined as follows:

$$\frac{\text{Total capacity of the H form [mol/l]} \times \text{molecular weight of nitrogen [g/mol]}}{\text{Dry weight [g/l]} \times \text{nitrogen content [\% by weight]}} \times 100\%$$

Thus, the TC/N ratio of chelating ion exchangers containing only aminoacetic acid groups corresponding to the formula (I) is 1, whereas for chelating ion exchangers containing only iminodiacetic acid groups corresponding to the formula (II), the TC/N ratio is 2. The TC/N ratio of the chelating ion exchangers prepared by the process of the invention is from 1.4 to 2.0 (preferably from 1.5 to 1.95).

The chelating resins prepared by means of the process of the invention are notable for an excellent osmotic stability (swelling stability).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1 (According to the Invention)

600 ml of a macroporous, weak-base anion exchanger containing 1.45 mol of primary amino groups is added while stirring to an initial charge of 600 g of deionized water. The suspension is heated to a temperature of 98° C. and, at this temperature, 325 g (2.75 mol) of 80% strength aqueous monochloroacetic acid and 490 g (5.5 mol) of 45% strength aqueous sodium hydroxide solution are simultaneously metered in over a period of 4 hours, with the pH being held at 10 during the entire reaction time. The reaction mixture is subsequently stirred for another 4 hours at 98° C. The product is filtered off and subsequently washed with deionized water.

Yield: 1080 ml of chelating resin (Na form)

Example 2 (According to the Invention)

The procedure of Example 1 is repeated, but the reaction is carried out at a temperature of 90° C.

Yield: 1080 ml of chelating resin (Na form)

Example 3 (Comparison)

The procedure of Example 1 is repeated, but the reaction is carried out at a temperature of 60° C. The consumption of 45% strength aqueous sodium hydroxide solution is 410 g.

Yield: 990 ml of chelating resin (Na form)

Example 4 (According to the Invention)

600 ml of a macroporous, weak-base anion exchanger containing 1.45 mol of primary amino groups is added while stirring to an initial charge of 600 g of deionized water. The suspension is heated to a temperature of 90° C. and, at this temperature, 321 g (2.75 mol) of sodium monochloroacetate and 243 g (2.73 mol) of 45% strength aqueous sodium hydroxide solution are simultaneously metered in over a period of 4 hours, with the pH being held at 10 during the entire reaction time. The reaction mixture is subsequently stirred for another 4 hours at 90° C. The product is filtered off and subsequently washed with deionized water.

Yield: 1080 ml of chelating resin (Na form)

Example 5 (Comparison)

The procedure of Example 4 is repeated, but the reaction is carried out at a pH of 12. The consumption of 45% strength aqueous sodium hydroxide solution is 238 g.

Yield: 950 ml of chelating resin (Na form)

Example 6 (According to the Invention)

600 ml of a macroporous, weak-base anion exchanger containing 1.36 mol of primary amino groups is added with stirring to an initial charge of 600 g of deionized water. The suspension is heated to a temperature of 85° C. and, at this temperature, 385 g (3.27 mol) of 80% strength aqueous monochloroacetic acid and 582 g (6.55 mol) of 45% strength aqueous sodium hydroxide solution are simultaneously metered in over a period of 4 hours, with the pH being held at 10 during the entire reaction time. The reaction mixture is subsequently stirred for another 4 hours at 85° C. The product is filtered off and subsequently washed with deionized water.

Yield: 1300 ml of chelating resin (Na form)

To convert the chelating resin to the H form, 600 ml of the resin in the Na form are placed in a column and 5.40 kg of 10% strength by weight sulfuric acid are introduced from the top. The resin is subsequently washed with 10 kg of deionized water.

Yield: 400 ml of chelating resin (H form)

Example 7 (Comparison)

The procedure of Example 6 is repeated, but the reaction is carried out at a pH of 12. The consumption of 45% strength aqueous sodium hydroxide solution is 574 g.

TABLE

| Example | Total capacity of Na form in mol/l | Total capacity of H form in mol/l | TC/N ratio | Degree of conversion in respect of monochloroacetic acid in % | Swelling stability as % of perfect beads |
|---|---|---|---|---|---|
| 1 | 2.10 | 2.80 | 1.60 | 82 | 97 |
| 2 | 2.00 | 2.70 | 1.55 | 79 | 97 |
| 3 (Comparison) | 1.85 | 2.40 | 1.35 | 66 | 91 |
| 4 | 2.05 | 2.73 | 1.60 | 81 | 96 |
| 5 (Comparison) | 1.60 | 2.05 | 1.15 | 55 | 80 |
| 6 | 2.05 | 3.15 | 1.90 | 82 | 95 |
| 7 (Comparison) | 1.70 | 2.55 | 1.55 | 55 | 82 |

Determination of the swelling stability:
25 ml of the chelating resin are placed in a column. In succession, 4% by weight of aqueous sodium hydroxide solution, deionized water, 6% by weight of hydrochloric acid, and deionized water are introduced, with the aqueous sodium hydroxide solution and the hydrochloric acid flowing through the resin from above and the deionized water being pumped through the resin from below. Elution is carried out according to a time cycle controlled by a control instrument, with 20 cycles being completed after 20 hours. After the cycles have been completed, 100 beads are examined under a microscope and the number of perfect beads is determined.

Determination of the degree of conversion with respect to monochloroacetic acid:

$$\frac{\text{Total capacity of Na form [mol/l]} \times \text{yield of Na form [l]}}{\text{Mol of monochloroacetic acid / Na monochloroacetate used}} \times 100\%$$

Determination of the TC/N ratio:

$$\frac{\text{Total capacity of H form [mol/l]} \times \text{molecular weight of nitrogen [g/mol]}}{\text{Dry weight [g/l]} \times \text{nitrogen content [\% by weight]}} \times 100\%$$

The results shown in the table demonstrate that a high degree of conversion based on monochloroacetic acid/sodium monochloroacetate can be achieved only in the claimed pH range (Examples 4 and 6 in comparison with Examples 5 and 7) and in the claimed reaction temperature range (Examples 1 and 2 in comparison with Example 3).

The selective or chelating ion exchangers prepared by the process of the invention have an improved swelling stability (Examples 1, 2, 4, and 6 in comparison with Examples 3, 5 and 7).

What is claimed is:

1. A process for preparing selective ion exchangers based on crosslinked vinylaromatic polymers and containing iminoacetic acid units of formula (I)

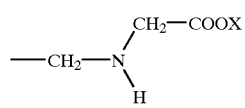 (I)

and/or iminoacetic acid units of formula (II)

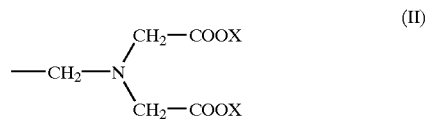 (II)

wherein X represents hydrogen or an alkali metal ion, comprising reacting a weak-base anion exchanger bearing primary amino groups with 1.90 to 2.40 mol of monochloroacetic acid and/or an alkali metal salt of monochloroacetic acid per mol of the primary amino groups at a temperature of from 70 to 110° C. and a pH of from 7 to 11.

2. A process according to claim 1 wherein each X represents hydrogen, sodium, and/or potassium.

3. A process according to claim 1 wherein the pH is maintained by controlled addition of aqueous sodium hydroxide solution.

4. A process according to claim 1 wherein the degree of conversion of the monochloroacetic acid and/or a salt of monochloroacetic acid with the primary amino groups is in the range from 0.7 to 1.00.

5. A process according to claim 1 wherein the monochloroacetic acid and an aqueous sodium hydroxide solution are metered continuously at a constant mass ratio to one another into the suspension of the weak-base anion exchanger.

* * * * *